United States Patent
Garimella et al.

(10) Patent No.: US 12,258,040 B2
(45) Date of Patent: Mar. 25, 2025

(54) SYSTEM FOR GENERATING SCENE CONTEXT DATA USING A REFERENCE GRAPH

(71) Applicant: Zoox, Inc., Foster City, CA (US)

(72) Inventors: Gowtham Garimella, Hayward, CA (US); Gary Linscott, Seattle, WA (US); Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 336 days.

(21) Appl. No.: 17/854,849

(22) Filed: Jun. 30, 2022

(65) Prior Publication Data
US 2024/0001958 A1    Jan. 4, 2024

(51) Int. Cl.
  *B60W 60/00*   (2020.01)
  *B60W 30/095*  (2012.01)
  *B60W 40/04*   (2006.01)
  *B60W 50/00*   (2006.01)

(52) U.S. Cl.
  CPC .... *B60W 60/0011* (2020.02); *B60W 30/0956* (2013.01); *B60W 40/04* (2013.01); *B60W 50/0097* (2013.01); *B60W 60/0015* (2020.02); *B60W 60/00274* (2020.02); *B60W 2554/4041* (2020.02); *B60W 2556/40* (2020.02)

(58) Field of Classification Search
None
See application file for complete search history.

(56) References Cited

U.S. PATENT DOCUMENTS

| | | |
|---|---|---|
| 2016/0375901 A1 | 12/2016 | Di Cairano et al. |
| 2017/0277192 A1* | 9/2017 | Gupta .............. B60W 30/20 |
| 2020/0377105 A1* | 12/2020 | Murashkin ........ B60W 40/04 |
| 2021/0089791 A1* | 3/2021 | Sithiravel .......... G01S 7/4802 |
| 2021/0108926 A1* | 4/2021 | Tran .................. G06T 17/05 |
| 2021/0122378 A1* | 4/2021 | Zhang ............... G06V 10/82 |
| 2021/0370980 A1 | 12/2021 | Ramamoorthy et al. |
| 2022/0180643 A1* | 6/2022 | Retterath .......... G06V 10/761 |
| 2023/0186640 A1* | 6/2023 | Kocamaz .......... G06V 10/225 382/104 |

(Continued)

FOREIGN PATENT DOCUMENTS

| | | |
|---|---|---|
| EP | 3342666 A1 | 7/2018 |
| KR | 20210066956 A | 6/2021 |

(Continued)

OTHER PUBLICATIONS

PCT Search Report and Written Opinion mailed Oct. 11, 2023 for PCT application No. PCT/US23/68719, 12 pages.

(Continued)

*Primary Examiner* — Ryan Rink
(74) *Attorney, Agent, or Firm* — Lee & Hayes, P.C.

(57) ABSTRACT

Techniques for improving operational decisions of an autonomous vehicle are discussed herein. In some cases, a system may generate reference graphs associated with a route of the autonomous vehicle. Such reference graphs can comprise precomputed feature vectors based on grid regions and/or lane segments. The feature vectors are usable to determine scene context data associated with static objects to reduce computational expenses and compute time.

20 Claims, 8 Drawing Sheets

(56) References Cited

U.S. PATENT DOCUMENTS

| | | | |
|---|---|---|---|
| 2023/0211799 A1* | 7/2023 | Ha | G06N 3/092 701/23 |
| 2023/0229960 A1 | 7/2023 | Zhu et al. | |
| 2023/0394823 A1* | 12/2023 | Weng | B60W 60/00276 |
| 2024/0149920 A1* | 5/2024 | Zheng | B60W 50/0097 |

FOREIGN PATENT DOCUMENTS

| | | |
|---|---|---|
| KR | 1020210066956 A | 6/2021 |
| WO | WO2016097690 A1 | 6/2016 |

OTHER PUBLICATIONS

Office Action for U.S. Appl. No. 17/854,932, mailed on Oct. 16, 2024, Garimella, "System for Generating Predicted Scene Context Data Using a Reference Graph", 35 Pages.

* cited by examiner

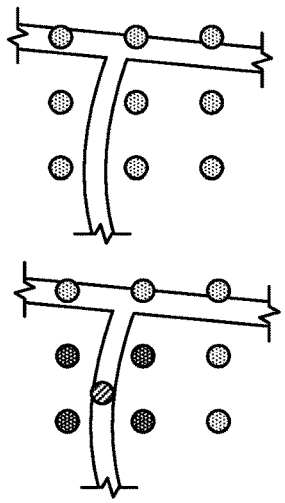

400

```
RECEIVE STATE DATA ASSOCIATED WITH AN OBJECT OPERATING ALONG
A TRAVERSABLE PORTION OF A PHYSICAL ENVIRONMENT
402
        ↓
ACCESS A REFERENCE GRAPH ASSOCIATED WITH THE PHYSICAL
ENVIRONMENT
404
        ↓
DETERMINE, BASED AT LEAST IN PART ON THE REFERENCE GRAPH AND
THE STATE DATA, ONE OR MORE NODES OF THE REFERENCE GRAPH
406
        ↓
DETERMINE, BASED AT LEAST IN PART ON FEATURE VECTORS
ASSOCIATED WITH THE ONE OR MORE NODES, A SCENE CONTEXT
VECTOR
408
        ↓
PERFORM, BASED AT LEAST IN PART ON THE SCENE CONTEXT VECTOR,
AN OPERATION OF AN AUTONOMOUS VEHICLE
410
```

FIG. 4

SYSTEM FOR GENERATING SCENE CONTEXT DATA USING A REFERENCE GRAPH

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may make operational decisions based on a scene context generated from sensor data representative of the physical environment. However, generating a scene context representative of dependencies between all agents and all environment features is computationally expensive and time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a flow diagram illustrating an example process associated with the performing operational decisions based on a scene context.

DETAILED DESCRIPTION

Figure 1:
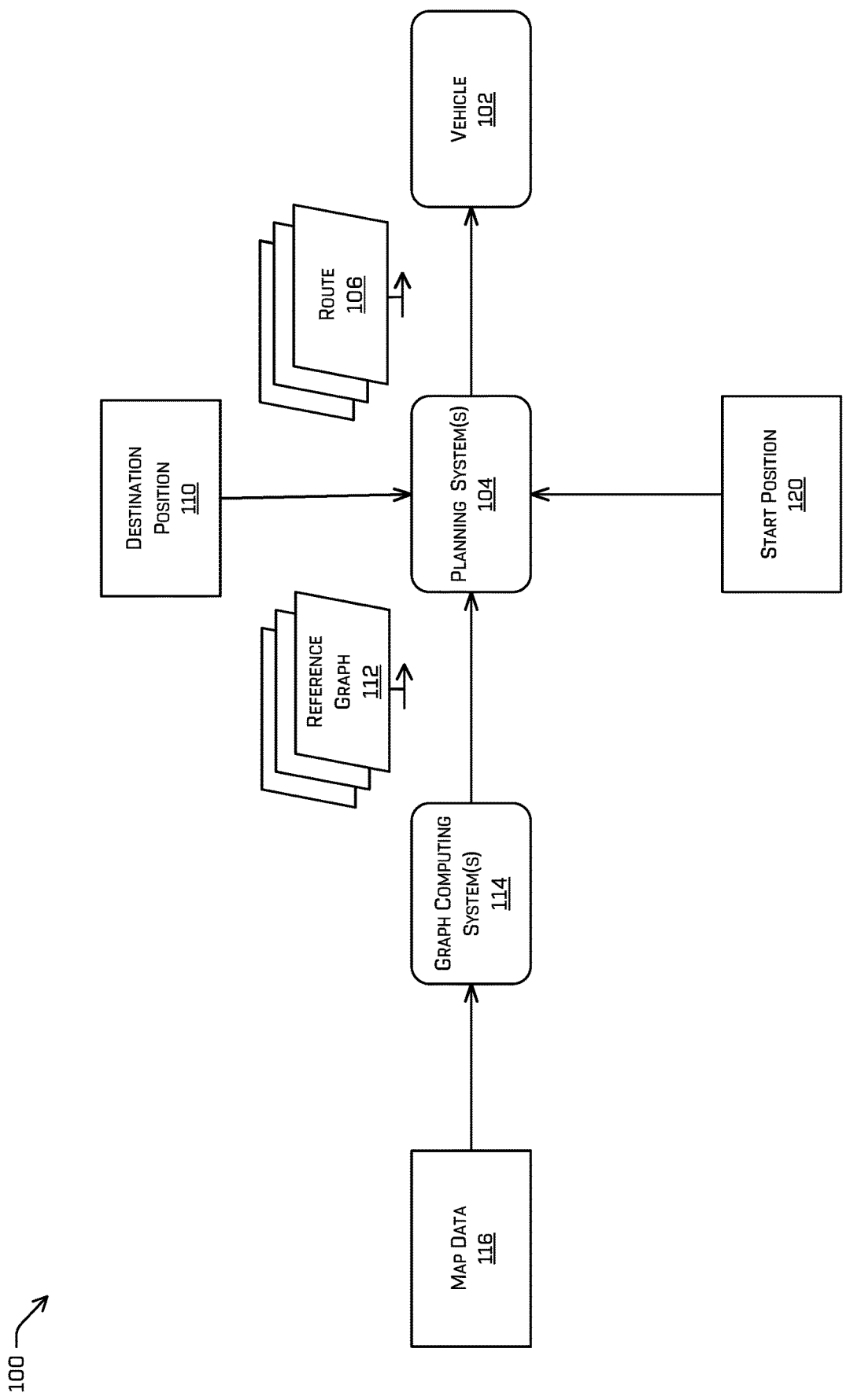
FIG. 1 is an example block-diagram illustrating an example architecture associated with determining a route for an autonomous vehicle.

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. While navigating, the autonomous vehicle may encounter both dynamic objects (e.g., vehicles, pedestrians, animals, and the like) and static objects (e.g., buildings, signage, parked vehicles, and the like) in the environment. In order to ensure the safety of the occupants and objects and make operational decisions, the system and vehicle, discussed herein, may generate and make operational decisions based at least in part on a scene context representing the static objects as well as segment, classify, and/or predict a status and/or behavior of the dynamic objects.

In some cases, the system discussed herein, unlike conventional systems that compute dependencies between visible dynamic and static objects in substantially real time as the vehicle is operating, may pre-compute or pre-generate scene context data based on the planned route and/or a reference graph representative of the static objects and associated features vectors. In this manner, the system may preform at least a portion of the processing prior to the operations of the vehicle, thereby reducing a period of time required to make operational decisions and improving safety of the autonomous vehicle.

In some examples, the system may generate a reference graph or reference grid of a physical environment. In some cases, the reference graph may correspond to a top down representation of the physical environment and include a plurality of discrete portions, such as lane segments, physical areas, locations, and/or the like. These discrete portions maybe correspond to a graph (e.g., a grid) of nodes. The system may populate the individual nodes with object data, such as static object data (e.g., tree data, road condition data, building data, object data—bench data, signal data, signs data, sidewalk data, crosswalk data, and the like) with the individual nodes depending on the corresponding respective portion of a physical environment. The nodes in the graph may not be uniform and may increase or decrease in density or position depending on, for example, corresponding physical environment topology. For instance, the may be denser or include more smaller regions along a corresponding traversable portion of a physical environment (such as along roadways) and include fewer larger regions along the untraversable regions (such as sidewalks, lawns, buildings, and the like). In some examples, the nodes of the reference graph may become sparser the further away from the traversable portion of the physical environment the graph becomes.

The system may then pre-compute or generate one or more feature vectors associated with a weighted attenuation over the objects (e.g., the road elements, at various nodes or grid regions). These pre-computed feature vectors may then be accessed by a vehicle during operations to provide or generate a scene context vector representative of the objects (such as static objects—foliage, signal lights, traffic signs, cross walks, lanes, roadside fixtures, and the like) nearby the vehicle to generate an aggregated feature vectors or scene context data using relevant nodes of the reference graph. Accordingly, it should be understood, that accessing or determining the scene context vector may be computationally less expensive and faster than generating the scene context vector in real-time based on sensor data captured by the vehicle as the feature vectors may be precomputed, thereby reducing time required to make operational decisions by the vehicle while operating.

In some implementations, as the vehicle operates, the vehicle may capture or generate sensor data representative of the physical environment and/or the position of the vehicle with respect to the physical environment. In these implementations, the system may utilize the position data of the vehicle to select or determine nodes of the reference graph and retrieve or provide an appropriate scene context vector or data. In some examples, the system may select a predetermined number (such as 2, 4, 6, 10, etc.) of nodes that are closest or physically proximate to the vehicle's position within a corresponding physical environment. In other examples, the system may select the nodes based on type, classification, one or more characteristics, a trajectory, velocity, acceleration, etc. of the vehicle together with the vehicle position. For instance, the system may predict a future position of the vehicle at a future time (such as 1, 2, 3, 5, 7, etc. seconds in the future) and select the nodes based on a proximity to the future position(s). In some examples, the system may favor or more heavily weight the nodes along a traversable portion of the graph (e.g., favoring selection of nodes along the road over nodes adjacent to the road). In some examples, the system may select each node within a threshold distance from the vehicle position or the future vehicle position. Once the nodes are selected, the system may interpolate the scene context vector or data from the pre-computed feature vectors of the selected grid regions.

In examples, the reference graph may include nodes representative of a state of objects and the vehicle. Similar to the example above, the nodes may include pre-computed feature vectors or data associated with the objects (such as stop signs locations, signal colors at given times, known visibility obstructions, and the like). The system may then utilize the vehicle state data to select or determine a number of nodes to use to generate or interpolate the scene context vector or data at the current position and/or the future position.

In another example, the reference graph may include nodes representative of a plurality of lane segments (such as along the traversable portion of the physical environment). Similar to the example above, the individual lane segments may include pre-computed feature vectors associated with the static objects. The system may then utilize the vehicle position data to select or determine a number of lane segments to use to generate or interpolate the scene context vector or data at the current position and/or the future position.

In some cases, the system may select the lane segments (or nodes) using one or more predetermined heuristic and/or predetermined number of lane segments. For example, the system may select the closest segment in each adjacent or nearby lane (e.g., within a threshold distance) and add additional lane segments to the set based on proximity to the vehicle position until a predetermined number of lane segments is met or exceeded. In some examples, the system may select adjacent lane segments (e.g., to the left, right, behind, and front) of the vehicle position and then add additional lane segments to the set based on proximity to the vehicle position until a predetermined number of lane segments is met or exceeded. In some cases, the system may select lane segments along an intersection (or other road or environment topologies) prior to adding the additional lane segments. For instance, the system may select a lane segment for each lane crossing and intersection in front of the vehicle. It should be understood that the heuristics provided are example heuristics for selecting lane segments and that additional heuristic and/or methods may be used to select the lane segments. In some examples, the heuristics, methods, and processes of selecting either lane segments and/or grid regions in the examples above may be machine learned using one or more machine learned method and/or network.

In the examples above, it should be understood that the vehicle may utilize the reference graph to generate both pre-planned routes from a start location to an end location as well as a trajectory derived or determined based on the pre-planned route, a current position, future positions, and the reference graph. For example, a planning system may utilize the reference graph to determine or plot the route between a start position and an end position and a perception system may query the reference graph using vehicle state data, vehicle position data, and the like to receive scene context vectors or data that may be utilized to adjust a trajectory or otherwise make operational decision (such as accelerate, decelerate, lane changes, and the like).

FIG. 1 is an example block-diagram illustrating an example architecture 100 associated with determining a route for an autonomous vehicle 102. For example, a planning system 104 associated with the vehicle 102 (such as integrated and/or remote) may determine a route 106 for the vehicle 102 based at least in part on a start position 108 and a destination position 110. For example, the planning system 104 may utilize a map or road data to route the vehicle 102 from the start position 108 to the destination position 110 via the traversable roadways.

In this example, the planning system 104 may also utilize a reference graph 112 associated with a physical environment that the vehicle 102 may be traversing. As discussed above, the reference graph 112 may include a plurality of nodes arranged corresponding to a top down representation of the physical environment. In some cases, the nodes may represent object data as feature vectors based on a geographical partitioning of the physical environment. In other examples, the nodes may represent object data as feature vectors based on a states or characteristics of the objects at the physical locations.

In some examples, a graph computing system 114 may pre-compute or generate one or more feature vectors associated with a weighted attenuation over the object data for proximate nodes based on map data 116 of the corresponding physical environment. As discussed above, the planning system 104 may query the reference graph 112 to receive scene context data representing a pre-computed attention of the feature vectors of relevant or selected nodes. In this manner, the planning system 104 may reduce the to reduce computing resources and time associate with the prediction system generating a scene context vector representative of the static objects nearby the vehicle.

Figure 2:
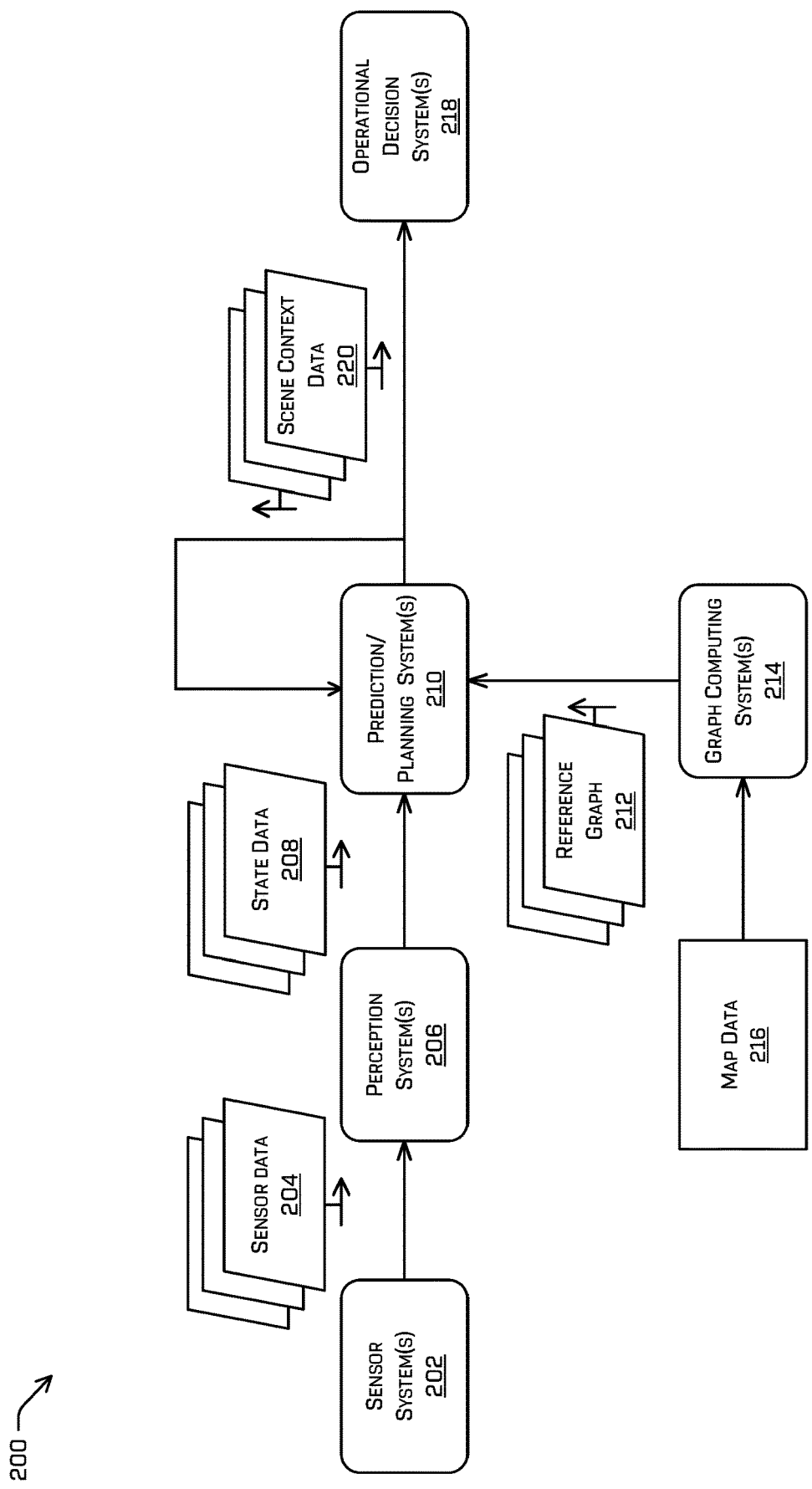
FIG. 2 is an example block-diagram illustrating an example architecture associated with operational decisions of an autonomous vehicle.

FIG. 2 is an example block-diagram illustrating an example architecture 200 associated with operational decisions of an autonomous vehicle, in accordance with embodiments of the disclosure. In this example, an autonomous vehicle may be equipped with a sensor system 202 to capture sensor data 204 of a physical environment surrounding the vehicle as the vehicle travels to a destination location. The sensor data 204 may be utilized by the autonomous vehicle to detect and avoid objects along the planned route. The sensor data 204 may be captured in frames at predetermined intervals, such as every millisecond.

In some examples, the sensor system 202 may provide sensor data 204 associated with a current interval of time of the sensor 202 to a perception system 206. The perception system 206 may be configured to generate object data and/or environment data associated with objects (e.g., static and/or dynamic objects) in the surrounding physical environment. In some cases, the sensor data 204 may comprise position data 208 and in other cases the system 200 may utilize the output of the perception system 206 and the sensor data 204 to determine or localize a position or state of the vehicle within the physical environment. The perception system 206 and/or the sensor system 202 may then provide the position data and/or state data 208 to the prediction system 210.

The prediction system 210 may also receive a reference graph 212 associated with the physical environment from a graph computing system 214. For example, the graph computing system 214 may generate the reference graph 212 based on map data 216 and/or a predetermined route associated with the autonomous vehicle. As one example, the reference graph 212 may be atop down representation of the physical environment and include a plurality of nodes, as discussed above. In some examples, the graph computing system 214 may pre-compute or generate one or more feature vectors associated with a weighted attenuation over the objects for proximate nodes. As discussed above, the pre-computed feature vectors may be provided to the prediction system 210 of the vehicle during operations as part of the reference graph 212 to reduce computing resources and time associate with the prediction system generating a scene context vector representative of the static objects nearby the vehicle.

As one illustrative example, the prediction system 210 may utilize the position data from the sensor system 202 to select or determine nodes of the reference graph 212. The prediction system 210 may then utilize the feature vectors (which were pre-computed based on the route) to generate a scene context data 220, such as a scene context vector. In some examples, the prediction system 210 may select a predetermined number (such as 2, 4, 6, 10, etc.) of nodes that are correspond to closest or physically proximate regions to the vehicle's position. In examples, the prediction system 210 may select a predetermined number of nodes based on a current state of the vehicle represented by the state data 208.

In examples, the prediction system 210 may select the nodes based on a future position or state of the vehicle. For instance, the prediction system 210 may predict a future position or state of the vehicle at a future time. In some cases, the prediction system 210 may utilize the scene context data 220 generated at a current state of the object or a future state of a prior iteration. In this manner, the scene context data 220 may be utilized to assist in predicting the future state of the vehicle at various or incremental periods of time. In this example, the prediction system 210 may select the nodes based on a proximity (e.g., graph or physical proximity) to the future position(s) and/or states. In some examples, the prediction system 210 may favor or weight the selection to nodes corresponding to a traversable portion of the graph 212 (e.g., favoring selection of grid regions corresponding to the road over grid locations adjacent to the road). In some examples, the prediction system 210 may select nodes corresponding to regions within a threshold distance from the vehicle position or the future vehicle position. Once the grid regions are selected, the prediction system 210 may interpolate the scene context data from the pre-computed feature vectors of the selected nodes.

The interpolation can be based on a physical position of a vehicle navigating an environment relative to adjacent or proximate map regions/nodes. For example, the vehicle may be equidistant from map portions wherein the map is partitioned into a grid. The corresponding nodes to the grid portions equidistant portion can be used to interpolate a corresponding feature vector at the position where the vehicle is located. The interpolation can weight the contribution from adjacent or approximate node vectors based on distances from the vehicle and the corresponding map portions (or centers or other features thereof).

As another illustrative example, the graph computing system 214 may generate the reference graph 212 as a plurality of lane segments along the traversable portion of the physical environment. Similar to the example above, the individual lane segments of the graph 212 may corresponding to nodes including pre-computed feature vectors associated with the static objects based on the route 220. The prediction system 210 may then again utilize the position data to select or determine a number of lane segments of the reference graph 212 to use to generate or interpolate the scene context data 216 at the current position and/or a future position or state.

In some cases, the prediction system 210 may select the lane segments using one or more predetermined heuristic and/or predetermined number of lane segments. For example, the prediction system 210 may select the closest segment in each adjacent or nearby lane (e.g., within a threshold distance) and add additional lane segments to the set based on proximity to the position represented by the position data and/or state data 208 until a predetermined number of lane segments is met or exceeded. In some examples, the prediction system 210 may select adjacent lane segments (e.g., to the left, right, behind, and front) of the position represented by the position data 208 and then add additional lane segments to the set based on proximity to the position represented by the position data or state data 208 until a predetermined number of lane segments is met or exceeded. In some cases, the prediction system 210 may select lane segments along an intersection prior to adding the additional lane segments. For instance, the prediction system 210 may select a lane segment for each lane crossing and intersection in front of the vehicle. In examples, a determination of which lane segments and/or how many lane segments can be selected based on an arrangement of lane segments, such as an intersection type (e.g., 4-way, roundabout, 3-2ay, one-way vs two-way, etc.), a road type (e.g., highway, city street, dirt road, etc.), and/or a predicted or known intention of an object (e.g., a vehicle turning left, going straight, etc.).

The scene context data 216 may then be received at an operational decision system 218 and used by the operational decision system 218 to make or cause the vehicle to perform operations as the vehicle traverses the physical environment. As the scene context data 216 is generated from pre-computed feature vectors of the reference graph 212, the operational decision may be made using fewer real time computations thereby improving the speed with which the autonomous vehicle may react to the physical environment.

Figure 3:
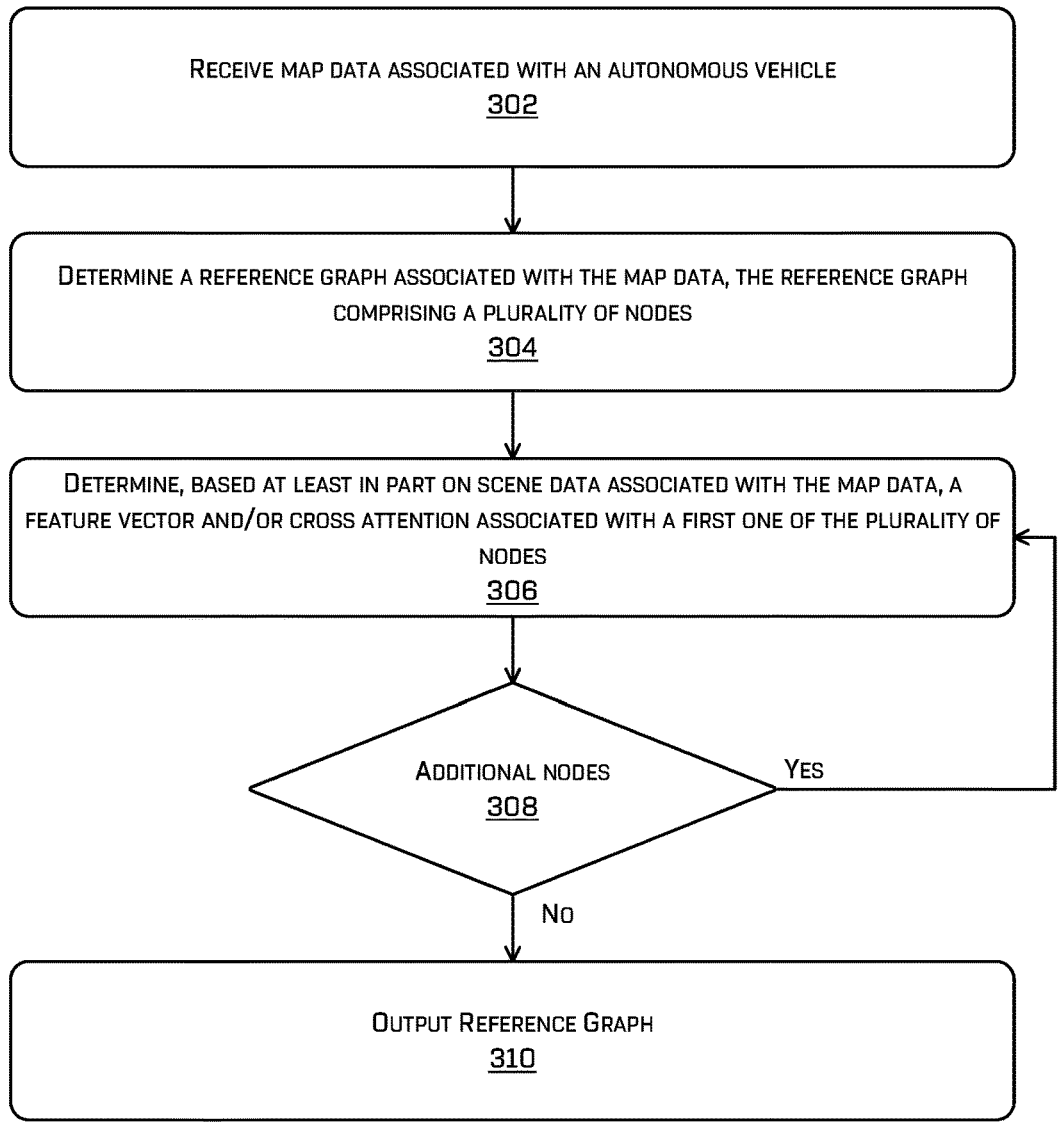
FIG. 3 is a flow diagram illustrating an example process associated with the generating a reference graph associated with a physical environment.
Figure 5:
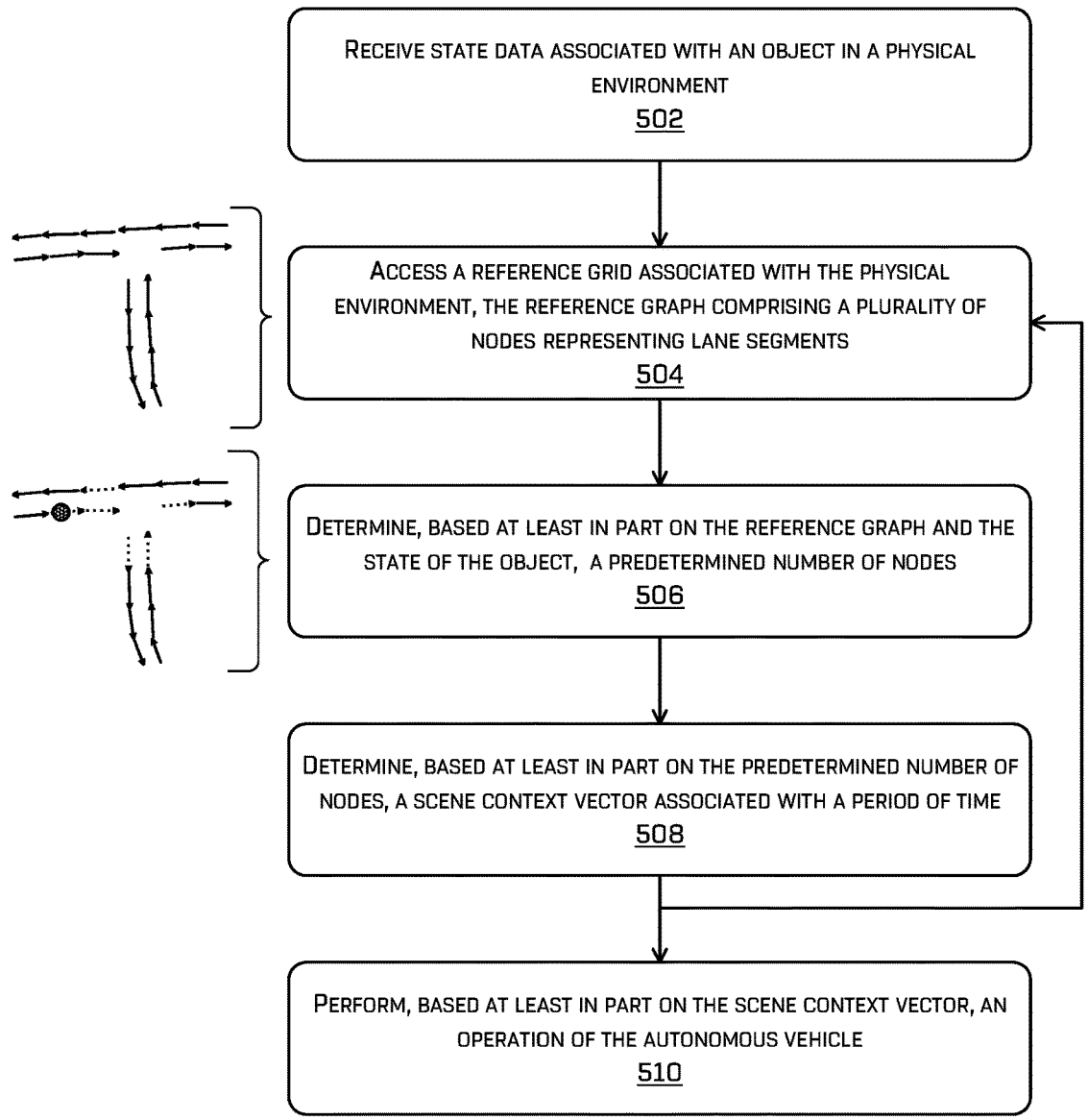
FIG. 5 is another flow diagram illustrating an example process associated with the performing operational decisions based on a scene context.

FIGS. 3-5 are flow diagrams illustrating example processes associated with utilizing reference grids in performing operational decisions of an autonomous discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process associated with the generating a reference graph associated with a physical environment. As discussed above, an autonomous vehicle may navigate and make operational decisions based on object data and relationships between the objects in an environment surrounding the vehicle. In these cases, a system and/or the vehicle may utilize a pre-computed reference graph associated with static objects and/or state data of the object (and/or the vehicle).

At 302, a system may receive a map data associated with an autonomous vehicle. For example, the map data may be associated with a physical environment and include object data associated with various objects at given times and/or dates. In some cases, the system may also receive or determine a route. The route may be received prior to the vehicle commencing operational activities or departing the start location. The route may be determined based on the starting location, destination location, current traffic conditions, road conditions, and the like.

At 304, the system may determine a reference graph associated with the route, a portion of the route, or a portion of an environment in which the vehicle may operate, the reference graph comprising a plurality of nodes. For example, as discussed above, the reference graph may be associated with a top down representation of the physical environment associated with the map data. The reference graph may divide the physical environment into a number of regions or nodes that comprise data associated with objects (e.g., state objects) physical located within the region. The nodes may vary in density, proximity, and size. For instance, the nodes may be denser or comprise more smaller regions along the traversable portion of the physical environment and fewer larger regions along the untraversable regions. In some examples, the nodes of the reference graph may become sparser the further from the traversable portion of the physical environment the graph becomes to reduce overall size and computing resources usable to process the reference graph.

At 306, the system may determine, based at least in part on scene data associated with the map data, a feature vector associated with a first one of the plurality of nodes and, in some cases, the system may also determine cross attention between the feature vector and feature vectors of nearby or proximate nodes within the graph space and/or physical space. The selection of proximate nodes can be based on adjacency, road types intersection types, and/or vehicle intentions as disclosed herein. The cross attention may comprise determining a weighted attenuation or interactions over the static object data.

At 308, the system may determine if additional nodes should be added to the reference graph. If there are additional nodes, the process 300 may return to 306 and determine feature vectors and cross attention for another node of the plurality of nodes. However, if the reference graph is complete (e.g., sufficiently populated to cover the route, route portion, or portion of an environment), then the process 300 may advance to 310 and the system may output the reference graph or make the reference graph available for use by operating autonomous vehicles.

FIG. 4 is a flow diagram illustrating an example process 200 associated with the performing operational decisions based on a scene context. As discussed above, an autonomous vehicle may navigate and make operational decisions based on object data and relationships between the objects in an environment surrounding the vehicle. In these cases, a system and/or the vehicle may generate pre-computed feature vectors associated with static objects, such as along a pre-planned route of the vehicle, to reduce computational expenses and processing time associated with making the operational decisions, thereby improving safety of the autonomous vehicle.

At 402, the system may receive state data associated with the autonomous vehicle operating along a traversable portion of a physical environment. For example, the vehicle may be following a pre-planned route from a starting location to a destination location. The autonomous vehicle may be equipped with one or more sensors that generate sensor data. The sensor data may be used to determine state data of the vehicle. For example, the state data may include acceleration, velocity, position, pose, localization in three-dimensional space, and/or location of the vehicle with respect to the physical environment as well as other characteristics of the vehicle.

At 404, the system may access a reference graph associated with the physical environment. For example, the system may query the reference graph in order to access scene context vector or data using a position and/or state of the vehicle. In some cases, the system may also query the reference graph based on a state and/or position of an object detected in the physical environment by the vehicle sensor systems.

At 406, the system may determine, based at least in part on the reference graph and the state data, one or more nodes of the reference graph. For example, the system may select a predetermined number of nodes that are proximate (in physical space and/or graph space) or closest to a current or future state or position of the vehicle. In some cases, the selection of the nodes may be based on one or more predetermined heuristics, such as selection of a first predetermined number of nodes along and/or associated with the traversable path and a second predetermined number of nodes based on physical proximity or a graph proximity to the vehicle. In examples, the nodes may be selected on a road type, an intersection type, and/or an intention of an object.

In some examples, the system may determine, based on a trajectory, velocity, acceleration, and the like, one or more future position and/or states of the vehicle. The system may then determine nodes based on the current position and/or state as well as one or more of the future locations and/or future states. In this manner, the system may determine scene context vectors for a period of time (such as 2, 5, 6, 8, 10, etc. seconds along the planned route and/or trajectory).

At 408, the system may determine, based at least in part on the feature vectors associated with the one or more nodes, a scene context vector or data. For example, the system may interpolate the scene context vector or data from the pre-computed feature vectors of the selected nodes. By determining the scene context vector or data based on the pre-computed feature vectors, the scene context vector or data may be generated faster using fewer resources, thereby reducing time required to make operational decisions by the vehicle while operating.

In some cases, such as when future positions or future states of the vehicle are utilized to select the nodes, the scene context vector may be associated with a period of time (such as 2, 4, 6, 8, etc. seconds in the future). The system may then return to 402, to determine or update the scene context data based on a new current position or the new current state of the vehicle (e.g., based on new sensor data) as well as proceed to 410. At 410, the system perform, based at least in part on the scene context vector, an operation of the autonomous vehicle (e.g., accelerate, brake, turn, change lanes, and the like). The scene context data can be used for navigation by the vehicle, predicting actions by agents in the environment, etc. through vehicle and object interaction with the environment characterized by the scene context data.

FIG. 5 is another flow diagram illustrating an example process 500 associated with the performing operational decisions based on a scene context. As discussed above, an autonomous vehicle may navigate and make operational decisions based on object data and relationships between the objects in an environment surrounding the vehicle. In these cases, a system and/or the vehicle may generate pre-computed feature vectors associated with static objects along a pre-planned route of the vehicle to reduce computational expenses and processing time associated with making the operational decisions, thereby improving the safety of the autonomous vehicle.

At 502, a system may receive a state data associated with an object (such as an autonomous vehicle) in a physical environment. The state data may include position data, localization data, operational data, and the like. In examples, the system may receive position data associated with the autonomous vehicle operating along the route. For example, the autonomous vehicle may be equipped with one or more sensors that generate sensor data that is usable to determine a position or location of the vehicle with respect to the physical environment. For example, the position data may include pose data, GPS data, other satellite based location data, and the like. In some cases, the lane segments may comprise pre-computed feature vectors associated with static objects.

At 504, the system may access a reference graph associated with the physical environment, the reference graph comprising a plurality of nodes representing lane segments. For example, the reference graph may include the plurality of lane segments along a traversable portion of the physical environment and each individual lane segment may represent a predetermined portion of the traversable environment and/or a time associated with traversing the portion. For example, the lane segments may be longer on roads with high speed limits or shorter on roads with lower speed limits. In this manner, the lane segments may vary in density, length, and the like depending on traffic conditions, road condition, or other environmental conditions (such as weather, time of year, time of day, or the like).

At 506, the system may determine, based at least in part on the reference graph and a state of the object, a number (that may be predetermined or dynamically determined) of nodes representing lane segments of the reference graph. For example, the system may utilize the position of the object to select or determine a number of nodes or lane segments to use in generating or interpolating a scene context vector. In some cases, the system may select the lane segments using one or more predetermined heuristic and/or predetermined number of nodes or lane segments. For example, the system may select proximate or closest segments in each adjacent or nearby nodes or lane (e.g., within a threshold distance) and add additional nodes or lane segments to the set based on proximity to the vehicle position until a predetermined number of lane segments is met or exceeded. In some examples, the system may select adjacent nodes or lane segments (e.g., to the left, right, behind, and front) of the vehicle position and then add additional nodes or lane segments to the set based on proximity to the vehicle position until a predetermined number of nodes or lane segments is met or exceeded. In some cases, the system may select nodes or lane segments along an intersection prior to adding the additional nodes or lane segments. For instance, the system may select a lane segment for each lane crossing and intersection in front of the vehicle. In examples, the nodes or lane segments may be selected if the lane segment is within a threshold distance of the vehicle position (or a future position as discussed above). In examples, the rode segments may be selected based on road type, intersection type, and/or object intention, as disclosed herein.

At 508, the system may determine, based at least in part on the number of nodes, a scene context vector associated with a period of time. For example, the system may interpolate the scene context vector from the pre-computed feature vectors of the selected nodes. By determining the scene context vector based on the pre-computed feature vectors, the scene context vector may be generated faster using fewer resources, thereby reducing time required to make operational decisions by the vehicle while operating. The system may then return to 504, to determine or update the scene context data based on a new current position or current state of the vehicle (e.g., based on new sensor data) as well as proceed to 510. At 510, the system perform, based at least in part on the scene context vector, an operation of the autonomous vehicle (e.g., accelerate, brake, turn, change lanes, and the like).

Figure 6:
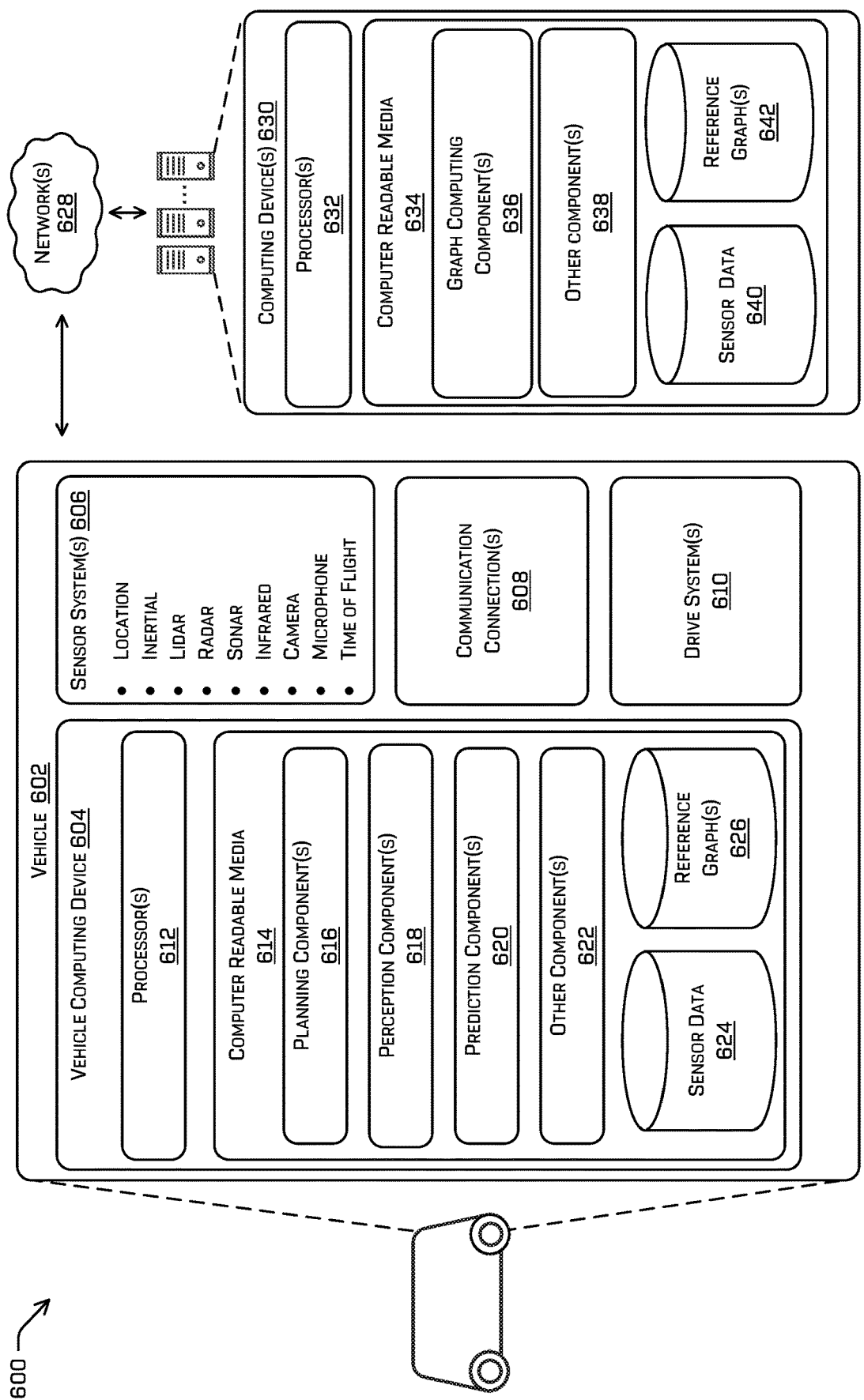
FIG. 6 depicts a block diagram of an example system for implementing the techniques discussed herein.

FIG. 6 depicts a block diagram of an example system 600 for implementing the techniques discussed herein. In at least one example, the system 600 may include a vehicle 602, such the autonomous vehicles discussed above. The vehicle 602 may include computing device(s) 604, one or more sensor system(s) 606, one or more communication connection(s) 610 (also referred to as communication devices and/or modems), and one or more drive system(s) 614. The one or more sensor system(s) 606 may be configured to capture the sensor data 628 associated with a surrounding physical environment.

In at least some examples, the sensor system(s) 606 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 606 may include multiple instances of each type of sensors. For instance, time-of-flight sensors may include individual time-of-flight sensors located at the corners, front, back, sides, and/or top of the vehicle 602. As another example, camera sensors may include multiple cameras disposed at various locations about the exterior and/or interior of the vehicle 602. In some cases, the sensor system(s) 606 may provide input to the computing device(s) 604.

The vehicle 602 may also include one or more emitter(s) 608 for emitting light and/or sound. The one or more emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enables communication between the vehicle 602 and one or more other local or remote computing device(s) (e.g., a remote teleoperations computing device) or remote services. For instance, the communication connection(s) 610 can facilitate communication with other local computing device(s) on the vehicle 602 and/or the drive system(s) 614. Also, the communication connection(s) 610 may allow the vehicle 602 to communicate with other nearby computing device(s) (e.g., other nearby vehicles, traffic signals, etc.).

The communications connection(s) 610 may include physical and/or logical interfaces for connecting the computing device(s) 604 to another computing device or one or more external network(s) 634 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 6G, 6G LTE, 5G, etc.), satellite communication, dedicated short-range communications (DSRC), or any suitable wired or wireless communications protocol that enables the respective computing device to interface with the other computing device(s). In at least some examples, the communication connection(s) 610 may comprise the one or more modems as described in detail above.

In at least one example, the vehicle 602 may include one or more drive system(s) 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 can include one or more sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which may receive and preprocess data from the sensor system(s) 606 and to control operation of the various vehicle systems. In some examples, the drive system controller can include one or more processor(s) and memory communicatively coupled with the one or more processor(s). The computer readable media 618 can store one or more modules to perform various functionalities of the drive system(s) 614. Furthermore, the drive system(s) 614 also include one or more communication connection(s) that enable communication by the respective drive system with one or more other local or remote computing device(s).

The computing device(s) 604 may include one or more processors 612 and one or more computer readable medias 618 communicatively coupled with the processor(s) 616. In the illustrated example, the computer readable medias 618 of the computing device(s) 604 stores planning system(s) or component(s) 616, perception system(s) or component(s) 622, prediction system(s) or component(s) 624, as well as one or more other system(s) or component(s) 626. The computer readable media 618 may also store data such as sensor data 628 captured or collected by the one or more sensors systems 606 and reference graph data 630.

The planning system 620 may be configured to determine a route for the vehicle 602 to follow to traverse through an environment. For example, the planning system 620 may determine various routes and paths and various levels of detail based at least in part on the identified objects, the predicted behaviors, states and/or characteristics of the object at future times, the confidence value associated with each predicted behavior or state, and a set of safety requirements corresponding to the current scenario (e.g., combination of objects detected and/or environmental conditions). In some instances, the planning system 620 may determine a route to travel from a first location (e.g., a current location) to a second location (e.g., a target location) in order to avoid an object obstructing or blocking a planned path of the vehicle 602. In some case, a route can be a sequence of waypoints for traveling between the two locations (e.g., the first location and the second location). In some cases, waypoints include streets, intersections, global positioning system coordinates, and the like.

The perception system 622 perform object detection, segmentation, and/or category on the sensor data 628. In some examples, the perception system 622 may generate processed perception data from the sensor data. The perception data may indicate a presence of objects that are in physical proximity to the vehicle 602 and/or a classification or type of the objects (e.g., car, pedestrian, cyclist, building, tree, road surface, curb, sidewalk, unknown, etc.).

The prediction system 624 may be configured to generate scene context data as discussed above based at least in part on the reference graph 630 associated with the route determined by the planning system 620 and/or the perception data and/or a position of the vehicle 602 relative to the physical environment.

In at least one example, the computing device(s) 604 may store one or more and/or system controllers, which may be configured to control steering, propulsion, braking, safety, emitters, communication, and other systems of the vehicle 602. The system controllers may communicate with and/or control corresponding systems of the drive system(s) 614 and/or other components of the vehicle 602, which may be configured to operate in accordance with a route provided from the planning system 620.

In some implementations, the vehicle 602 may connect to computing device(s) 634 via the network(s) 632. The computing device 634 may include one or more processors 636 and memory 638 communicatively coupled with the one or more processors 636. In at least one instance, the processor(s) 636 may be similar to the processor(s) 616 and the memory 638 may be similar to the computer readable media 618. In the illustrated example, the computer readable media 638 of the computing device(s) 634 stores the sensor data and the reference graph data. The computer readable media 638 may also store a graph computing system(s) or component(s) 640 as well as other components 642, such as an operating system.

The processor(s) 616 of the computing device(s) 604 and the processor(s) 636 of the computing device(s) 634 may be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The computer readable media 618 of the computing device(s) 604 and the computer readable media 638 of the computing device(s) 636 are examples of non-transitory computer-readable media. The computer readable media 618 and the computer readable media 638 can store an operating system and one or more software applications, instructions, programs, and/or data to implement the methods described herein and the functions attributed to the various systems. In various examples, the computer readable media 618 and the computer readable media 638 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the computer readable media 618 and the computer readable media 638 can be implemented as a neural network.

Figure 7:
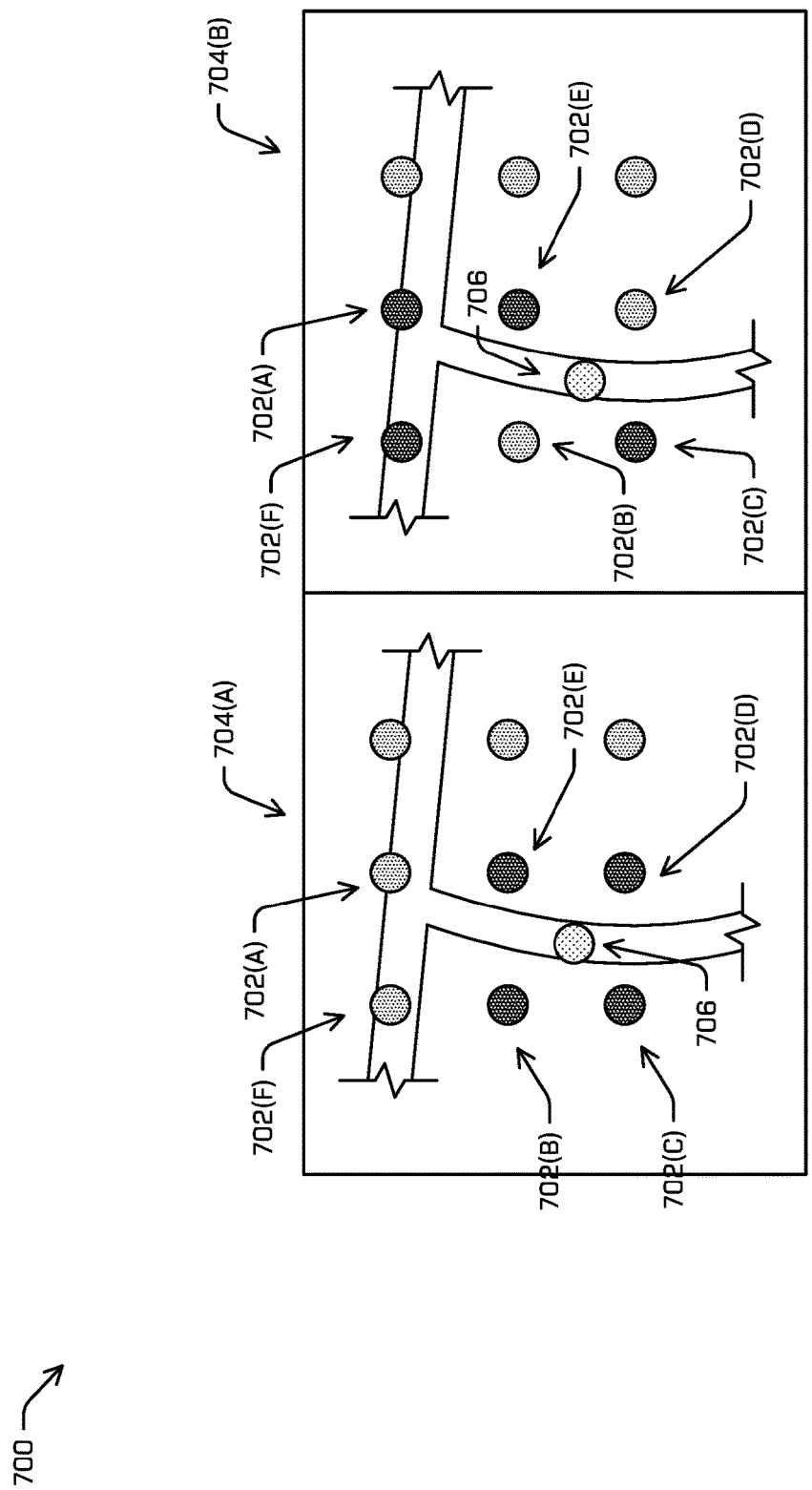
FIG. 7 is a pictorial diagram illustrating an example of reference graph associated with operations an autonomous vehicle.

FIG. 7 is a pictorial diagram illustrating an example of reference graph 700 associated with operations an autonomous vehicle. The current reference graph 700 is overlayed with a physical environment presented as a top-down view in which the environment is partitioned into grid regions, generally indicated by 702(A)-(F). In 704(A) and 704(B), different grid regions and corresponding nodes are selected for use in generating the scene context vector or data as discussed above. For example, in the example 704(A) the system may select grid regions physically proximate to the position of the vehicle 706 and in the example 704(B) the system may select grid regions along the traversable portion of the reference grid and proximate to the vehicle position 706.

More specifically, in example 704(A), a vehicle located at position 706 may interpret a scene context vector from adjacent nodes 702(B)-(E) as these nodes are the closest and equidistant from vehicle at position 706. In example 704(B), nodes 702(A), (C), (E), and (F) are used for interpolation. These nodes may be selected based on heuristics, road type, intersection type, agent intention, environmental context, etc. as disclosed herein.

Figure 8:
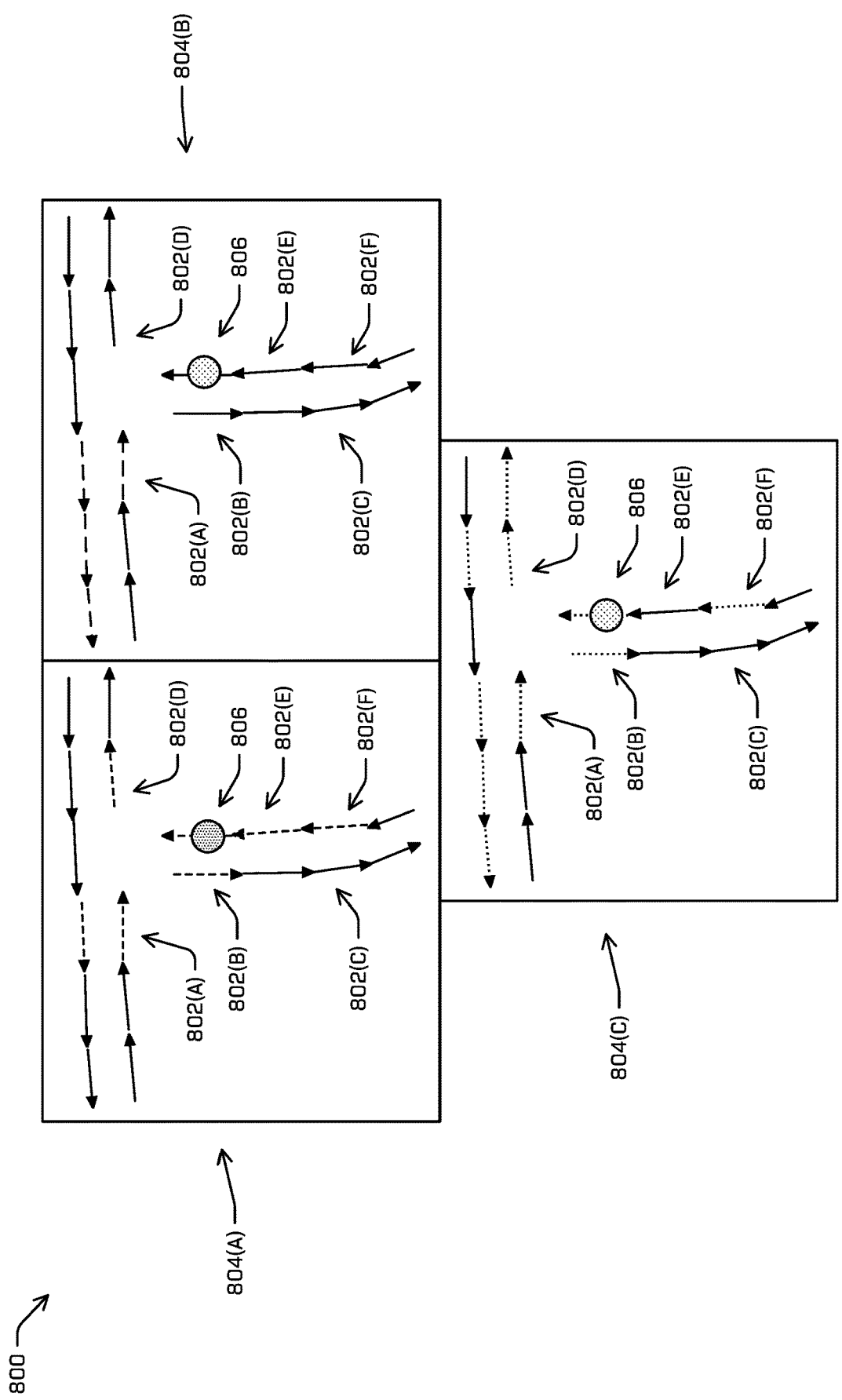
FIG. 8 is a pictorial diagram illustrating an example of reference graph associated with operations an autonomous vehicle.

FIG. 8 is a pictorial diagram illustrating an example of reference graph 800 associated with operations an autonomous vehicle. In the current reference graph 800 the physical environment is presented as a top-down view in which the environment is partitioned into lane segments, generally indicated by 802(A)-(F). In this example, the system may utilize three heuristics, generally indicated by examples 804(A)-(C), to select lane segments for use in generating the scene context vector or data as discussed above. For example, in the example 804(A) the system may select lane segments proximate to the vehicle position 806. In the example 804(B) the system may select lane segments based on the vehicle position 806 and the route (e.g., the vehicle is turning left). In the example 804(C) the system may select lane segments based on flow of traffic through the intersection and the vehicle position. These road segments may be selected based on heuristics, road type, intersection type, agent intention, environmental context, etc. as disclosed herein.

EXAMPLE CLAUSES

A. A system comprising: one or more processors; and one or more non-transitory computer readable media storing instructions executable by the one or more processors, wherein the instructions, when executed, cause the system to perform operations comprising: receiving a sensor data associated with a physical environment surrounding an autonomous vehicle; receiving a reference graph associated with the physical environment, the reference graph comprising a plurality of nodes, individual nodes of the plurality of nodes comprising a respective feature vector representative of object data associated with the individual node; determining, based at least in part on the sensor data, a state of an object within the physical environment; determining, based at least in part on the state of the object and the reference graph, a number of nodes of the plurality of nodes; generating, based at least in part on feature vectors of the number of nodes, scene context data associated with the physical environment; and controlling an autonomous vehicle based at least in part on the scene context data.

B. The system of claim A, wherein the operations further comprising: determining, based at least in part on the scene context data, a future state of the object relative to the physical environment; determining, based at least in part on the future state of the object and the reference graph, a second number of nodes of the plurality of nodes; generating, based at least in part on the second number of nodes of the reference graph, second scene context data associated with the physical environment; and wherein controlling the autonomous vehicle is based at least in part on the second scene context data.

C. The system of claim A, wherein the nodes of the reference graph corresponding to a respective discrete portion of the physical environment.

D. The system of claim A, wherein determining the number of nodes of the plurality of nodes is based at least in part on a position of the object.

E. The system of claim A, wherein determining the number of nodes of the plurality of nodes is based at least in part on a physical distance or graph distance between the individual nodes of the plurality of nodes and the object.

F. The system of claim A, wherein determining the number of nodes is based on a heuristic associated with characteristics of the physical environment.

G. The system of claim A, wherein the features vectors of the reference graph are determined prior to the receiving the reference graph.

H. The system of claim A, wherein the object is the autonomous vehicle.

I. One or more non-transitory computer-readable media storing instructions that, when executed, cause one or more processors to perform operations comprising: determining state data associated with an object and a physical environment proximate to the object; receiving, based at least in part on the state data and a reference graph, a subset of the reference graph comprising two or more nodes of the reference graph; determining, based at least in part on the two or more nodes, scene context data associated with the physical environment; and controlling an autonomous vehicle based at least in part on the scene context data.

J. The one or more non-transitory computer-readable media of claim I, wherein receiving the reference graph further comprises: selecting the two or more nodes from a plurality of nodes based at least in part on the state data and a characteristic of the physical environment.

K. The one or more non-transitory computer-readable media of claim I, wherein the state data comprises position data of the object and receiving the reference graph further comprises: selecting the two or more nodes from a plurality of nodes based at least in part on the position data of the object.

L. The one or more non-transitory computer-readable media of claim I, wherein receiving the reference graph further comprises: selecting the two or more nodes from a plurality of nodes is based at least in part on a heuristic.

M. The one or more non-transitory computer-readable media of claim I, wherein receiving the determining, based at least in part on the two or more nodes, scene context data associated with the physical environment comprises: interpreting the scene context data from context data of the two or more nodes.

N. The one or more non-transitory computer-readable media of claim I, wherein the receiving the subset of the reference graph is based at least in part on a route associated with the autonomous vehicle.

O. A method comprising: determining state data associated with an object and a physical environment surrounding the object; receiving, based at least in part on the state data and a reference graph, a subset of the reference graph comprising two or more nodes of the reference graph; determining, based at least in part on the two or more nodes, scene context data associated with the physical environment; and controlling an autonomous vehicle based at least in part on the scene context data.

P. The method of claim O, wherein the state data is current state data and further comprising: determining, based at least in part on the current state data and the scene context data, future state data of the object relative to the physical environment; determining, based at least in part on the future state data of the object and the reference graph, a second subset of the reference graph; generating, based at least in part on the second subset of the reference graph, second scene context data associated with the physical environment; and wherein controlling the autonomous vehicle is based at least in part on the second scene context data.

Q. The method of claim O, wherein the state data comprises position data of the object and receiving the reference graph further comprises: selecting the two or more nodes from a plurality of nodes based at least in part on the position data of the object.

R. The method of claim O, wherein receiving the reference graph further comprises: selecting the two or more nodes from a plurality of nodes based at least in part on the state data and a characteristic of the physical environment.

S. The method of claim O, wherein controlling the autonomous vehicle further comprises determining a trajectory associated with the autonomous vehicle based at least in part on the scene context data.

T. The method of claim O, wherein controlling the autonomous vehicle further comprises determining a pre-planned route associated with the autonomous vehicle based at least in part on the scene context data.

U. A system comprising: one or more processors; and one or more non-transitory computer readable media storing instructions executable by the one or more processors, wherein the instructions, when executed, cause the system to perform operations comprising: receiving state data associated with an object within a physical environment; determining, based at least in part on the state data, a first subset of a reference graph associated with the physical environment, the first subset comprising two or more nodes of the reference graph; determining, based at least in part on a feature vector associated with individual ones of the two or more nodes of the first subset, current scene context data associated with the physical environment; determining, based at least in part on the current scene context data, future state data of the object; determining, based at least in part on the future state data, a second subset of a reference graph associated with the physical environment, the second subset comprising two or more nodes of the reference graph; determining, based at least in part on a feature vector associated with individual ones of the two or more nodes of the second subset, future scene context data associated with the physical environment; and controlling an autonomous vehicle based at least in part on the future scene context data.

V. The system of claim U, wherein determining the future scene context data associated with the physical environment further comprises: iteratively until one or more thresholds are meet or exceeded: determining, based at least in part on the current scene context data, the future state data associated with the object; determining, based at least in part on the future state data, a next subset of the reference graph, the next subset comprising two or more nodes of the reference graph; determining, based at least in part on a feature vector associated with individual ones of the two or more nodes of the next subset, future scene context data associated with the physical environment; and setting the current scene context data equal to the future scene context data.

W. The system of claim V, wherein the one or more thresholds is a time threshold and each iteration increments the time by a certain amount of time.

X. The system of claim V, wherein determining the next subset of the reference graph further comprises selecting the two or more nodes based at least in part on a graph distance or a physical distance between the object and individual nodes of the two or more nodes.

Y. The system of claim V, wherein determining the next subset of the reference graph is based at least in part on a pre-planned route of the autonomous vehicle.

Z. The system of claim V, wherein receiving the next subset of the reference graph further comprises: determining, based at least in part on the current scene context data, a predicted future location of the object; determining, based on the predicted future location of the object, the second subset of the reference graph.

AA. One or more non-transitory computer-readable media storing instructions that, when executed, cause one or more processors to perform operations comprising: receiving a sensor data associated with a physical environment associated with an object; determining, based at least in part on the sensor data, state data associated with the object; determining, based at least in part on the state data and a reference graph, current scene context data associated with the object; iteratively until one or more thresholds are meet or exceeded: determining, based at least in part on the current scene context data, future state data associated with the object; determining, based at least in part on the future state data and the reference graph, future scene context data associated with the object; and setting the current scene context data equal to the future scene context data; and controlling an autonomous vehicle based at least in part on the future scene context data.

AB. The one or more non-transitory computer-readable media of claim AA, wherein the object is the autonomous vehicle.

AC. The one or more non-transitory computer-readable media of claim AA, wherein determining the future scene context data further comprises: determining, based at least in part on the current scene context data, a subset of the reference graph comprising two or more nodes of the reference graph; and determining the future scene context data based at least in part on feature vectors associated with individual ones of the two or more nodes.

AD. The one or more non-transitory computer-readable media of claim AC, wherein scene context data is representative of a cross attention between the feature vectors associated with the two or more nodes.

AE. The one or more non-transitory computer-readable media of claim AC, wherein the two or more nodes represent a discrete portion of the physical environment.

AF. The one or more non-transitory computer-readable media of claim AA, wherein determining the future scene context data further comprises: determining, based at least in part on the current scene context data and a route of the autonomous vehicle, a future position of the object relative to the physical environment; determining, based at least in part on the future position, a subset of the reference graph comprising two or more nodes of the reference graph; and determining the future scene context data based at least in part on a feature vector associated with individual ones of the two or more nodes.

AG. The one or more non-transitory computer-readable media of claim AA, wherein the one or more thresholds is a time threshold and each iteration increments the time by a predetermined amount of time.

AH. A method comprising: receiving a sensor data associated with a physical environment associated with an object; determining, based at least in part on the sensor data, state data associated with the object; determining, based at least in part on the state data and a reference graph, current scene context data associated with the object; iteratively until one or more thresholds are meet or exceeded: determining, based at least in part on the current scene context data, future state data associated with the object; determining, based at least in part on the future state data and the reference graph, future scene context data associated with the object; and setting the current scene context data equal to the future scene context data; and controlling an autonomous vehicle based at least in part on the future scene context data.

AI. The method of claim AH, wherein the object is the autonomous vehicle.

AJ. The method of claim AH, wherein determining the future scene context data further comprises: determining, based at least in part on the current state data, a subset of the reference graph comprising two or more nodes of the reference graph; and determining the future scene context data based at least in part on feature vectors associated with individual ones of the two or more nodes.

AK. The method of claim AJ, wherein scene context data is representative of a cross attention between the feature vectors associated with the two or more nodes.

AL. The method of claim AH, wherein determining the future scene context data further comprises: determining, based at least in part on the current scene context data and a route of the autonomous vehicle, a future position of the object relative to the physical environment; determining, based at least in part on the future position, a subset of the reference graph comprising two or more nodes of the reference graph; and determining the future scene context data based at least in part on a feature vector associated with individual ones of the two or more nodes.

AM. The method of claim AH, wherein the one or more thresholds is a time threshold and each iteration increments the time by a predetermined amount of time.

AN. The method of claim AH, wherein determining the future scene context data is based at least in part on at least one of a trajectory of the autonomous vehicle or a pre-planned route of the autonomous vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 3 through 5.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer readable media storing instructions executable by the one or more processors, wherein the instructions, when executed, cause the system to perform operations comprising:
receiving sensor data associated with a physical environment surrounding an autonomous vehicle;
receiving a reference graph associated with the physical environment, the reference graph comprising a plurality of nodes, individual nodes of the plurality of nodes comprising a respective feature vector representative of object data;
determining, based at least in part on the sensor data, a state of an object within the physical environment;
determining, based at least in part on the state of the object and the reference graph, a number of nodes of the plurality of nodes;
generating, based at least in part on feature vectors of the number of nodes, scene context data associated with the physical environment, wherein the feature vectors of the reference graph are computed prior to receiving the reference graph and prior to receiving the sensor data; and
controlling the autonomous vehicle based at least in part on the scene context data.

2. The system of claim 1, the operations further comprising:
determining, based at least in part on the scene context data, a future state of the object relative to the physical environment;
determining, based at least in part on the future state of the object and the reference graph, a second number of nodes of the plurality of nodes;
generating, based at least in part on the second number of nodes of the reference graph, second scene context data associated with the physical environment; and
wherein controlling the autonomous vehicle is based at least in part on the second scene context data.

3. The system of claim 1, wherein the individual nodes of the reference graph correspond to a respective discrete portion of the physical environment.

4. The system of claim 1, wherein determining the number of nodes of the plurality of nodes is based at least in part on a position of the object.

5. The system of claim 1, wherein determining the number of nodes of the plurality of nodes is based at least in part on a physical distance or graph distance between the individual nodes of the plurality of nodes and the object.

6. The system of claim 5, wherein determining the number of nodes is based on a heuristic associated with characteristics of the physical environment.

7. One or more non-transitory computer-readable media storing instructions that, when executed, cause one or more processors to perform operations comprising:
determining, based on sensor data, state data associated with an object and a physical environment proximate to the object;
receiving, based at least in part on the state data and a reference graph, a subset of the reference graph comprising two or more nodes of the reference graph;
determining, based at least in part on the two or more nodes, feature vectors representing scene context data associated with the physical environment, wherein the feature vectors are computed prior to receiving the reference graph and prior to receiving the sensor data; and
controlling an autonomous vehicle based at least in part on the scene context data.

8. The one or more non-transitory computer-readable media of claim 7, wherein receiving the reference graph further comprises:
selecting the two or more nodes from a plurality of nodes based at least in part on the state data and a characteristic of the physical environment.

9. The one or more non-transitory computer-readable media of claim 7, wherein the state data comprises position data of the object and receiving the reference graph further comprises:
selecting the two or more nodes from a plurality of nodes based at least in part on the position data of the object.

10. The one or more non-transitory computer-readable media of claim 7, wherein receiving the reference graph further comprises:
selecting the two or more nodes from a plurality of nodes is based at least in part on a heuristic.

11. The one or more non-transitory computer-readable media of claim 7, the operations further comprising
interpreting the scene context data from context data of the two or more nodes.

12. The one or more non-transitory computer-readable media of claim 7, wherein the receiving the subset of the reference graph is based at least in part on a route associated with the autonomous vehicle.

13. A method comprising:
determining, based on sensor data, state data associated with an object and a physical environment surrounding the object;
receiving, based at least in part on the state data and a reference graph, a subset of the reference graph comprising two or more nodes of the reference graph;
determining, based at least in part on the two or more nodes, feature vectors representing scene context data associated with the physical environment, wherein the feature vectors are computed prior to receiving the reference graph and prior to receiving the sensor data; and
controlling an autonomous vehicle based at least in part on the scene context data.

14. The method of claim 13, wherein the state data is current state data and the method further comprises:
determining, based at least in part on the current state data and the scene context data, future state data of the object relative to the physical environment;
determining, based at least in part on the future state data of the object and the reference graph, a second subset of the reference graph;
generating, based at least in part on the second subset of the reference graph, second scene context data associated with the physical environment; and
wherein controlling the autonomous vehicle is based at least in part on the second scene context data.

15. The method of claim 13, wherein the state data comprises position data of the object and receiving the reference graph further comprises:
selecting the two or more nodes from a plurality of nodes based at least in part on the position data of the object.

16. The method of claim 13, wherein receiving the reference graph further comprises:
  selecting the two or more nodes from a plurality of nodes based at least in part on the state data and a characteristic of the physical environment.

17. The method of claim 13, wherein controlling the autonomous vehicle further comprises determining a trajectory associated with the autonomous vehicle based at least in part on the scene context data.

18. The method of claim 13, wherein controlling the autonomous vehicle further comprises determining a pre-planned route associated with the autonomous vehicle based at least in part on the scene context data.

19. The system of claim 1, the operations further comprising:
  determining, based at least in part on a future state of the object and the reference graph, a second number of nodes of the plurality of nodes; and
  generating, based at least in part on the second number of nodes of the reference graph, second scene context data associated with the physical environment.

20. The one or more non-transitory computer-readable media of claim 7, the operations further comprising:
  determining, based at least in part on a future state of the object and the reference graph, a second subset of nodes of the two or more nodes; and
  generating, based at least in part on the second subset of nodes, second scene context data associated with the physical environment.

* * * * *